E. V. BLOOMQUIST.
PHOTO STICKER.
APPLICATION FILED SEPT. 8, 1919.
1,342,248.
Patented June 1, 1920.
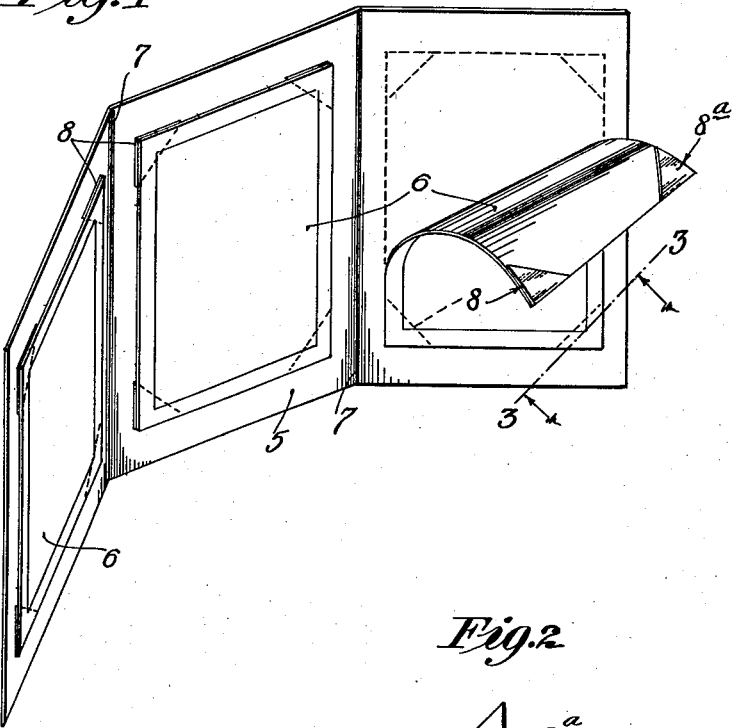
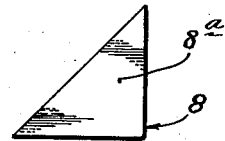
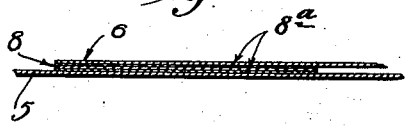
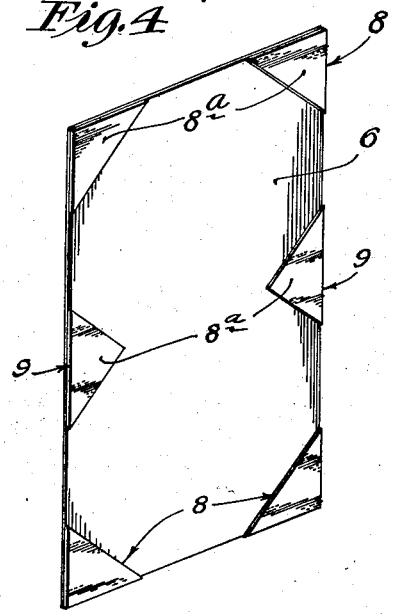
Inventor
Ernest V. Bloomquist
By his Attorneys

UNITED STATES PATENT OFFICE.

ERNEST V. BLOOMQUIST, OF MINNEAPOLIS, MINNESOTA.

PHOTO-STICKER.

1,342,248.  Specification of Letters Patent.  Patented June 1, 1920.

Application filed September 8, 1919. Serial No. 322,317.

*To all whom it may concern:*

Be it known that I, ERNEST V. BLOOMQUIST, a citizen of the United States, residing at Minneapolis, in the county of Hennepin and State of Minnesota, have invented certain new and useful Improvements in Photo-Stickers; and I do hereby declare the following to be a full, clear, and exact description of the invention, such as will enable others skilled in the art to which is appertains to make and use the same.

My invention has for its object to provide improved means for quickly attaching photographs to cards, leaves or other mounting sheets, and to such ends the invention consists of novel devices and arrangements of parts hereinafter described and defined in the claim.

In accordance with my invention I provide a plurality of so called "stickers" that have adhesive material on both faces. A plurality of these stickers are first properly positioned and stuck to the back of the photograph at the corners and sometimes at intermediate points, and then the photograph may be quickly stuck to the mounting sheet by moistening the exposed surfaces of the stickers and pressing the photograph against the mounting sheets.

The invention is illustrated in the accompanying drawings, wherein like characters indicate like parts throughout the several views.

Referring to the drawings:

Figure 1 is a perspective view showing several photographs applied to mounting sheet in accordance with my invention, one of the photographs being only partially secured;

Fig. 2 is a face view of one of the stickers;

Fig. 3 is an enlarged section on line 3—3 of Fig. 1; and

Fig. 4 is a perspective view showing a photograph with several of the stickers applied to the back thereof.

In Figs. 1 and 3 the so called mounting sheet 5 is of a size for the application thereto of 3 photographs 6, and the said mounting sheet is arranged to be folded on lines 7, but this feature constitutes no part of my present invention.

The stickers 8 are preferably rightangle-triangles and the same are provided on both faces with adhesive materials $8^a$, see particularly Figs. 2 and 3.

For small photographs it is sufficient to apply 4 of these stickers, one to each of the four corners of the back of the photograph. When the photograph is to be applied to the mounting sheet, the exposed surfaces of the stickers are moistened, and then pressed against the mounting sheet. This will securely fasten the photograph to the mounting sheet.

Fig. 4 shows the same construction illustrated in the other views, but illustrates a larger photograph which in addition to the corner stickers is provided at its sides with intermediate stickers 9. Preferably the stickers 9 are of the same form as the corner stickers 8, but they are applied with their hypotenuse alined with the edges of the photograph. The intermediate stickers might be of different form from the corner stickers, but they are advisedly made in the same form so that any sticker may be applied at any place. It is important, however, that the said stickers be of rightangle-triangle form so that they will fit the corner of the photograph.

Obviously the stickers may be provided at very small cost, and they may be very easily applied to photographs, and photographs with the applied stickers, will then be very easily and quickly applied in proper positions on the mounting sheets. The photographs with the stickers applied, as is evident, may be applied at any desired place on the mounting sheet, because each photograph carries its own adhesive or sticking means all ready properly positioned on the back of the photographs.

What I claim is:—

A photograph having on its back at the corners thereof thin stickers secured thereto by adhesive material and having exposed adhesive faces which, when moistened, are adapted to secure the photograph to a mounting sheet, the said stickers being of angular formation.

In testimony whereof I affix my signature in the presence of two witnesses.

ERNEST V. BLOOMQUIST.

Witnesses:
CLARA DEMAREST,
HARRY D. KILGORE.